L. A. HAWKINS.
SPEED REGULATING ARRANGEMENT.
APPLICATION FILED AUG. 11, 1920.

1,428,588.

Patented Sept. 12, 1922.

Inventor:
Laurence A. Hawkins,
by Albert G. Davis
His Attorney.

Patented Sept. 12, 1922.

1,428,588

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

SPEED-REGULATING ARRANGEMENT.

Application filed August 11, 1920. Serial No. 402,759.

*To all whom it may concern:*

Be it known that I, LAURENCE A. HAWKINS, a citizen of the United States, residing at Schenectady, in the county of Schenectady, State of New York, have invented certain new and useful Improvements in Speed-Regulating Arrangements, of which the following is a specification.

My invention relates to a speed regulating arrangement for direct current motors, and particularly to an arrangement for maintaining the speed of the motor constant when the voltage impressed upon the motor windings varies over a wide range.

My invention is especially applicable for use in controlling the speed of a motor supplied with current from a trolley circuit and driving a generator supplying current to a constant potential circuit. Since the voltage of a trolley current usually varies over a very wide range, it is necessary to provide an arrangement for maintaining the speed of the motor constant as the trolley voltage varies in order to keep the voltage of the generator constant.

One object of my invention is to provide a new regulating arrangement for automatically controlling the excitation of the motor so as to maintain the speed thereof constant at any desired value.

In carrying out my invention, I employ one or more electron discharge tubes, such as kenotrons, so connected as to control the excitation of the motor, and means for varying the filament current of the tubes in accordance with variations in the speed of the motor.

My invention will be better understood from the following description taken in connection with the accompanying drawing, and its scope will be pointed out in the appended claims.

Figure 1:
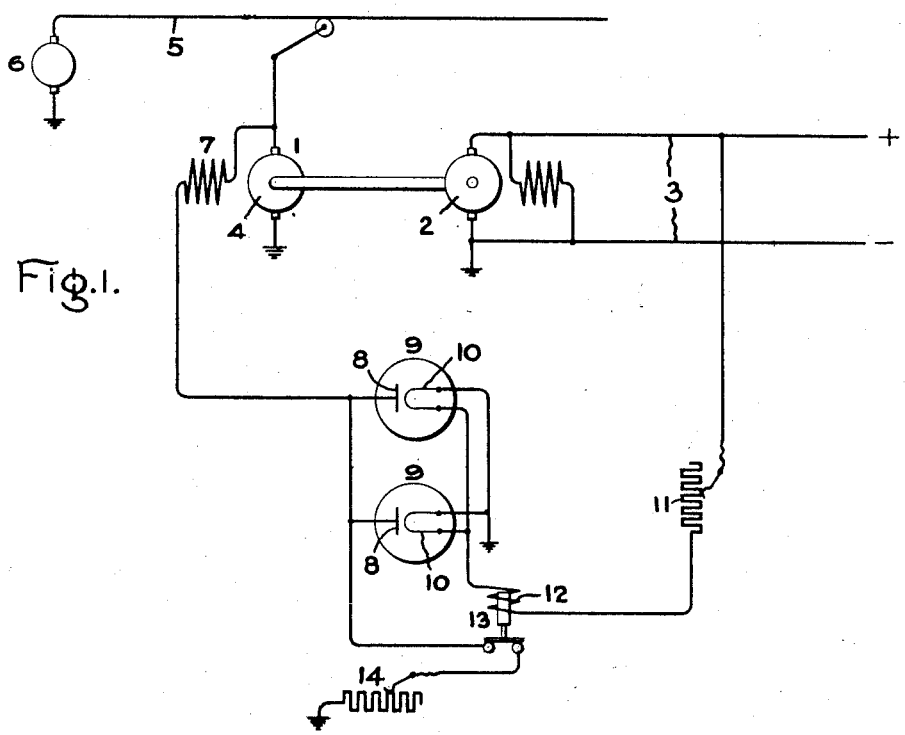
Figure 2:
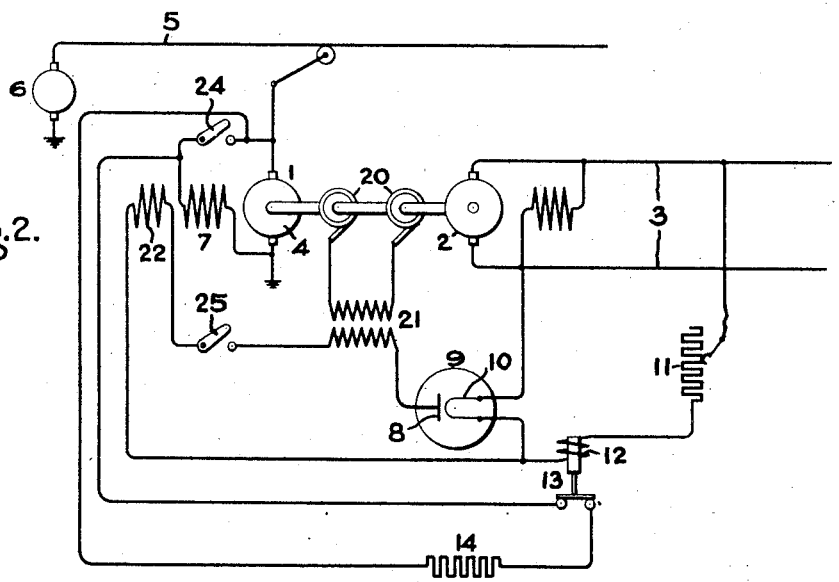

In the accompanying drawings, Fig. 1 represents one embodiment of my invention, and Fig. 2 a modification thereof.

Referring to Fig. 1 of the drawing, 1 represents a direct current motor operated from a circuit of varying high voltage and driving a shunt wound generator 2 which is adapted to supply current to the constant potential low voltage circuit 3. The motor 1 is provided with an armature 4 connected between ground and the trolley wire 5 which is supplied with current from a direct current generator 6 or any other suitable source.

The motor 1 is also provided with a field winding 7 one terminal of which is connected to the trolley wire 5 and the other side of which is connected to ground through the electron discharge tubes 9. Each tube, which I have shown as being a kenotron, is provided with the usual anode 8 which is connected to the terminal of the field winding 7 and a cathode filament 10, one terminal of which is connected to ground and the other terminal of which is connected in series with an adjustable resistance 11 to the ungrounded side of the circuit 3. While I have shown two kenotrons in the field circuit of the motor, it will be evident that any number may be used. In series with the filaments 10 of the kenotrons is connected a coil 12 of a relay 13. This relay 13, in its deenergized position, connects the field winding 7 in series with an adjustable resistance 14 directly to ground.

As is well known, electron discharge tubes are in effect current limiting devices, that is, the amount of current which they will allow to pass through them depends upon the temperature of the filament and a small variation in the filament current produces a very great variation in the current through the tube. With the connections shown in Fig. 1, any slight increase in the speed of the motor 4 increases the voltage of the generator 2, which, in turn, increases the filament current. This increase in the filament current increases the temperature of the filament so that a larger current is allowed to flow through the field winding 7 thereby decreasing the speed of the motor. Similarly, if the speed of the motor 4 decreases, the voltage of the generator 2 is decreased, which, in turn, decreases the filament current. The temperature of the filament is thereupon decreased so that the current through the field winding 7 is decreased thereby increasing the speed of the motor. Therefore, it will be observed that with the connections as shown, the filament current of each tube is varied in accordance with variations in the speed of the motor, thereby controlling the excitation of the motor so that the speed of the motor is maintained substantially constant.

If, for any reason, the filaments of all the tubes burn out, the coil 12 of the relay 13 then becomes deenergized and the relay 13 connects the field winding 7 of the motor in series with the adjustable resistance 14 directly to ground. This arrangement is provided to prevent the motor from running away due to the motor field circuit being opened, when all of the filaments burn out or the ground connection of the tubes is broken. Also it is apparent that when the motor is started the circuit of the motor field winding 7 is completed through the contacts of the relay 13 until the speed of the motor reaches a predetermined value which is sufficient to heat the filaments 10 up to allow curent to flow through the tubes The relay 13, the coil of which is connected in the filament circuit, then operates to open the circuit through its contacts thereby automatically changing the connections of the field winding so the current therein is controlled by the tube.

As an added feature I connect the grounded terminals of the filaments 10 directly to ground instead of to the grounded side of the circuit 3. If the terminals of the filaments 10 were connected across the circuit 3 and the ground connection became broken, the filament circuits would not be interrupted, whereas the motor field circuit through the kenotrons would be interrupted. Under these conditions the coil 12 would be energized and therefore the motor field circuit would be open and the motor would run at an excessive speed, or the high voltage of the trolley circuit would break down the insulation of the low voltage circuit 3. With the connections as shown, however, the filament currents are broken in case the ground connection of either the circuit 3 or the filaments 10 is interrupted. Consequently, the coil 12 of relay 13 is deenergized whereupon the motor field circuit is completed through the resistance 14 to prevent the motor from running away.

Since kenotrons do not operate efficiently at low voltages, the arrangement shown in Fig. 1 requires a considerable number of kenotrons in parallel if the voltage of the circuit 5 is low. In order to adapt my invention for use in connection with a low voltage circuit, I propose the arrangement shown in Fig. 2, which is a modification of the arrangement shown in Fig. 1. In this modification, the motor 1 is provided with collector rings 20 which are connected to the primary winding of a step-up transformer 21, the secondary of which is connected in series with the kenotron 9 and a motor field winding 22. The collector rings 20 are connected to points on the armature winding of a motor 4 so as to deliver alternating current. Since the kenotron is inherently a rectifier, a pulsating current will flow through the field winding 22.

Switches 24 and 25 are inserted in series with the field windings 7 and 22 respectively of the motor 1. When the motor is being started, switch 24 is closed so that the field winding 7 is excited. When the motor begins to rotate a voltage is induced in the secondary winding of the step-up transformer 21 and the switch 25 may then be closed so as to energize the field winding 22. If it is so desired, the switch 24 may be opened after the motor begins to rotate and the switch 25 is closed.

The contacts of the relay 13, the coil of which is connected in the filament circuit, are connected in the circuit of the field winding 7 so that this field circuit is automatically closed whenever the speed of the motor is below a predetermined value, or the filament circuit is broken. Therefore, the switches 24 and 25 may be omitted if it is so desired.

The operation of the arrangement shown in Fig. 2 will be obvious from the description of the operation given above for the arrangement shown in Fig. 1. If the speed of motor 1 varies, the voltage of the generator 2 and consequently the current through the filament 10 of the kenotron also varies. This variation in the filament current changes the temperature of the filament, thereby allowing more or less current to flow through the field winding 22 to maintain the speed of the motor constant. By using the transformer 21, I am able to impress any desired voltage across the kenotron 9 for efficiently operating the same.

Although I have shown and described several modifications of my invention, it will be understood that other modifications and changes may be made without departing from the spirit and scope of my invention as set forth in the appended claims.

What I claim as new and desire to secure by Letters Patent of the United States, is:—

1. A speed regulating arrangement for a direct current motor comprising an electron discharge tube connected in series with a field winding of said motor, means for varying the filament current of said tube in accordance with variations in the speed of said motor, and means adapted to complete a circuit for said motor field winding independent of said tube when the filament circuit of said tube is open.

2. A speed regulating arrangement for a direct current motor comprising an electron discharge tube connected in series with a field winding of said motor, means for varying the filament current of said tube in accordance with variations in the speed of said motor, and a relay having a coil in the said motor filament circuit adapted to complete a circuit for said motor field winding independent of said tube when the filament circuit is open.

3. A speed regulating arrangement for a direct current motor comprising a direct current generator driven by said motor, one terminal of said generator being grounded, an electron discharge tube connected in series with a field winding of said motor and having one terminal of its cathode connected to the ungrounded side of said generator and the other terminal connected directly to ground, and a relay having a coil in the filament circuit adapted to complete a circuit for said motor field winding independent of said tube when the filament circuit is open.

4. A speed regulating arrangement for a direct current motor comprising an electron discharge tube adapted to control the excitation of said motor, means for varying the filament current of said tube in accordance with variations in the speed of said motor, and means in circuit with the filament for automatically changing the motor connections.

In witness whereof, I have hereunto set my hand this 10th day of August 1920.

LAURENCE A. HAWKINS.